(12) United States Patent
Zheng

(10) Patent No.: US 10,284,466 B2
(45) Date of Patent: *May 7, 2019

(54) SERVICE PROCESSING METHOD, DEVICE, AND SYSTEM

(71) Applicant: Huawei Technologies Co., Ltd., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,781

(22) Filed: Jun. 8, 2018

(65) Prior Publication Data

US 2018/0295055 A1 Oct. 11, 2018

Related U.S. Application Data

(63) Continuation of application No. 15/449,686, filed on Mar. 3, 2017, now Pat. No. 10,103,978, which is a (Continued)

(30) Foreign Application Priority Data

Jul. 11, 2012 (CN) .......................... 2012 1 0239173

(51) Int. Cl.
*H04L 12/723* (2013.01)
*H04L 12/801* (2013.01)
(Continued)

(52) U.S. Cl.
CPC .............. *H04L 45/50* (2013.01); *H04L 45/02* (2013.01); *H04L 45/507* (2013.01); *H04L 47/17* (2013.01); *H04L 63/0892* (2013.01)

(58) Field of Classification Search
CPC ....... H04L 45/50; H04L 45/02; H04L 45/507; H04L 47/17; H04L 63/0892
See application file for complete search history.

(56) References Cited

U.S. PATENT DOCUMENTS

| 2002/0176370 A1 | 11/2002 | Ohba et al. |
| 2011/0110373 A1 | 5/2011 | Ghosh et al. |

(Continued)

FOREIGN PATENT DOCUMENTS

| CN | 101141172 A | 3/2008 |
| CN | 101582709 A | 11/2009 |

(Continued)

OTHER PUBLICATIONS

Crabbe, E., et al, "PCEP Extensions for Stateful PCE," draft-ietf-pce-stateful-pce-00; Network Working Group, Internet-Draft, Intended status: Standards Track, Feb. 28, 2012, 51 pages.

(Continued)

*Primary Examiner* — Ronald B Abelson
(74) *Attorney, Agent, or Firm* — Slater Matsil, LLP

(57) ABSTRACT

Embodiments of the present invention relate to the field of communications technologies and provide a service processing method, device, and system, where service expansion can be performed without changing an original device of an operator. A service processing method includes acquiring business service information corresponding to a to-be-processed service flow, where the business service information includes a service flow identifier of the to-be-processed service flow and a service label corresponding to the service flow identifier. The method includes sending the business service information corresponding to the to-be-processed service flow to a service router, so that the service router processes, according to the business service information, the to-be-processed service flow.

27 Claims, 14 Drawing Sheets

Related U.S. Application Data continuation of application No. 14/582,923, filed on Dec. 24, 2014, now Pat. No. 9,590,991, which is a continuation of application No. PCT/CN2013/078555, filed on Jul. 1, 2013.

(51) Int. Cl.
  *H04L 29/06* (2006.01)
  *H04L 12/751* (2013.01)

(56) References Cited

U.S. PATENT DOCUMENTS

| | | | |
|---|---|---|---|
| 2011/0158237 A1* | 6/2011 | McDysan | H04L 12/56 |
| 2012/0281540 A1 | 11/2012 | Khan et al. | |
| 2013/0272305 A1 | 10/2013 | Lefebvre et al. | |

FOREIGN PATENT DOCUMENTS

| | | |
|---|---|---|
| CN | 102045777 A | 5/2011 |
| CN | 102571602 A | 7/2012 |

OTHER PUBLICATIONS

Joseph, D.A., et al., "A Policy-Aware Switching Layer for Data Centers," University of California at Berkeley, Jun. 24, 2008, 12 pages.
Nordstrom, E., et al., "Serval: An End-Host Stack for Service-Centric Networking," Princeton University, Apr. 25, 2012, 14 pages.
Awduche, D., et al, "RSVP-TE: Extensions to RSVP for LSP Tunnels," Network Working Group, RFC 3209, Dec. 2001, 61 pages.
Berger, L., Editor, Movaz Networks, "Generalized Multi-Protocol Label Switching (GMPLS) Signaling Resource ReserVation Protocol-Traffic Engineering (RSVP-TE) Extensions," Network Working Group, RFC 3473, Jan. 2003, 42 pages.
Kompella, K., et al, "Signalling Unnumbered Links in Resource ReSerVation Protocol-Traffic Engineering (RSVP-TE)," Network Working Group, RFC 3477, Jan. 2003, 9 pages.
Vasseur, JP. Ed, et al, "Intermediate System to Intermediate System (IS-IS) Extensions for Advertising Router Information," Network Working Group, RFC 4971, Jul. 2007, 9 pages.
Vasseur, JP. Ed., et al, "Path Computation Element (PCE) Communication Protocol (PCEP)," Network Working Group, RFC 5440, Mar. 2009, 87 pages.
Sivabalan, S. Ed., et al, "Diffserv-Aware Class-Type Object for the Path Computation Element Communication Protocol," Network Working Group, RFC 5455, Mar. 2009, 9 pages.
Oki, E., et al, "Extensions to the Path Computation Element Communication Protocol (PCEP) for Route Exclusions," Network Working Group, RFC 5521, Apr. 2009, 16 pages.
Le Roux. JL. et al, "Encoding of Objective Functions in the Path Computation Element Communication Protocol (PCEP)," Network Working Group, RFC 5541, Jun. 2009, 23 pages.
Lee, Y. et al, "Path Computation Element Communication Protocol (PCEP) Requirements and Protocol Extensions in Support of Global Concurrent Optimization," Network Working Group, RFC 5557, Jul. 2009, 26 pages.
Enns, R. Ed., et al, "Network Configuration Protocol (NETCONF)," Internet Engineering Task Force (IETF), RFC 6241, Category: Standards Track, Jun. 2011, 113 pages.
Crabbe, E., et al, "Path Computation Element Communication Protocol (PCEP) Extensions for Stateful PCE," Internet Engineering Task Force (IETF), RFC 8231, Category: Standards Track, Sep. 2017, 57 pages.

\* cited by examiner

SERVICE PROCESSING METHOD, DEVICE, AND SYSTEM

CROSS-REFERENCE TO RELATED APPLICATIONS

This application is a continuation of U.S. patent application Ser. No. 15/449,686, filed on Mar. 3, 2017. The U.S. patent application Ser. No. 15/449,686 is a continuation of U.S. patent application Ser. No. 14/582,923, filed on Dec. 24, 2014, which is a continuation of International Application No. PCT/CN2013/078555, filed on Jul. 1, 2013. The International Application claims priority to Chinese Patent Application No. 201210239173.X, filed on Jul. 11, 2012. All of the afore-mentioned patent applications are hereby incorporated by reference in their entireties.

TECHNICAL FIELD

The present invention relates to the field of communications technologies, and in particular, to a service processing method, device, and system.

BACKGROUND

With the development of Internet, a BRAS (Broadband Remote Access Server) or a BNG (Broadband Network Gateway) needs to gradually enhance various value-added service processing capabilities, for example, OTT (Over the top) video processing, DPI (Deep Packet Inspection), a firewall, and antivirus. Currently, expansion of all those capabilities is concentrated on the BRAS or the BNG. However, because there will be more types of value-added services in the future, when each service is expanded, software upgrade and even hardware upgrade need to be performed on the BRAS or the BNG. Regardless of the software upgrade or the hardware upgrade, an operator needs to power off a BRAS or BNG device, and original services of users on the BRAS or the BNG are interrupted. Currently, the number of users that the BRAS or the BNG can support is very large, and if device power-off is performed, the range of influence from the power interruption can be very large, which greatly affects user experience.

SUMMARY

Embodiments of the present invention provide a service processing method, device, and system, where service expansion can be performed without changing an original device of an operator.

To achieve the foregoing objective, the embodiments of the present invention use the following technical solutions.

A service processing method includes acquiring business service information corresponding to a to-be-processed service flow. The business service information includes a service flow identifier of the to-be-processed service flow and a service label corresponding to the service flow identifier. The method further includes sending the business service information corresponding to the to-be-processed service flow to a service router, so that the service router processes, according to the business service information, the to-be-processed service flow. The service label is a service atom that undergoes encoding processing or a service atom cluster that undergoes encoding processing.

A service processing method includes receiving business service information sent by a controller, where the business service information includes a service flow identifier and a service label of a first service flow. The method further includes receiving the first service flow and acquiring a service routing table, and processing the first service flow according to the business service information and the service routing table. The service label is a service atom or service atom cluster that undergoes encoding processing.

A service processing device includes a business service information acquiring unit configured to acquire business service information corresponding to a to-be-processed service flow. The business service information includes a service flow identifier of the to-be-processed service flow and a service label corresponding to the service flow identifier. A business service information sending unit configured to send the business service information corresponding to the to-be-processed service flow to a service router, so that the service router processes, according to the business service information, the to-be-processed service flow. The service label is a service atom that undergoes encoding processing or a service atom cluster that undergoes encoding processing.

Another service processing device includes a receiving unit configured to receive business service information sent by a controller. The business service information includes a service flow identifier and a service label of a first service flow. The receiving unit is further configured to receive the first service flow. An acquiring unit is configured to acquire a service routing table. A processing unit is configured to process the first service flow according to the business service information and the service routing table.

A service processing system, including the foregoing two service processing devices.

According to the service processing method, device, and system that are provided by the embodiments of the present invention, a service processing sequence is identified by using a service atom or a service atom cluster, and business service information corresponding to the service atom or the service atom cluster is generated, so that a service router and a service server adjacent to the service router process a to-be-processed service flow according to the business service information. In a service processing manner provided by the embodiments, development of a new service changes into recombination of existing service atoms or adding of a new service atom, so that an operator may proceed to process a service by still using an existing device, and therefore service expansion can be performed without changing an original device of the operator.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
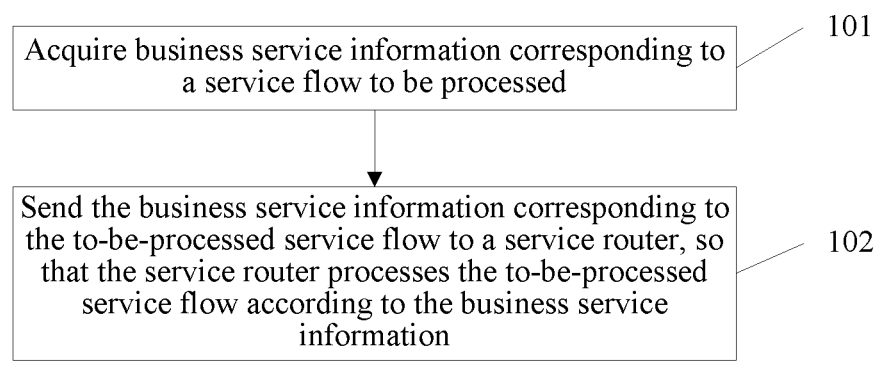
FIG. 1 is a flowchart of a service processing method according to Embodiment 1 of the present invention.

The embodiment of the present invention provides a service processing method, and the method is, for example, a method on a controller side. As shown in FIG. 1, the method includes the following steps.

101. Acquire business service information corresponding to a to-be-processed service flow.

The business service information includes a service flow identifier of the to-be-processed service flow and a service label corresponding to the service flow identifier, where the service label is a service atom or service atom cluster that undergoes encoding processing, and the service atom cluster is a sequence formed by at least two service atoms arranged according to a sequence. The service atom is used to identify a service processing step required for processing the to-be-processed service flow. The encoding processing refers to that different binary digits or m-ary digits are used to indicate different service atoms or service atom clusters.

For example, if a service flow requires one service processing step, a service label corresponding to the service flow is a service atom that undergoes encoding processing; if a service flow needs multiple service processing steps, service labels corresponding to the service flow are multiple service atom clusters that undergo encoding processing.

102. Send the business service information corresponding to the to-be-processed service flow to a service router, so that the service router processes the to-be-processed service flow according to the business service information.

Figure 2:
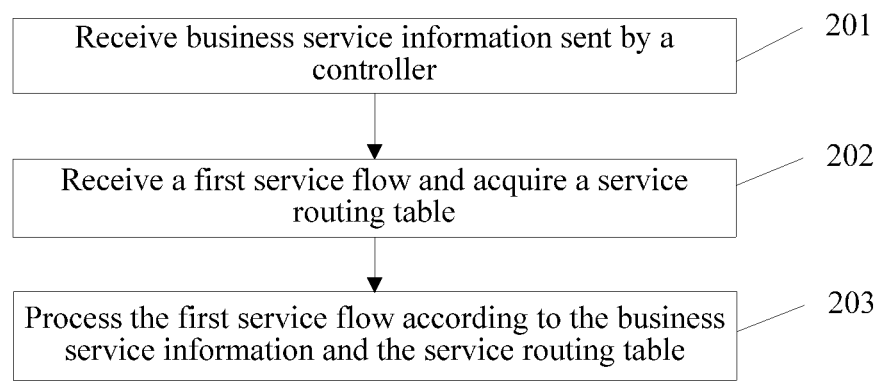
FIG. 2 is a flowchart of another service processing method according to Embodiment 1 of the present invention.

The present invention further provides a service processing method, and the method is, for example, a method on a service router side. As shown in FIG. 2, the method includes the following steps.

201. Receive business service information that is sent by a controller and corresponding to a to-be-processed service flow.

The business service information includes a service flow identifier of the to-be-processed service flow and a service label corresponding to the service flow identifier. The service label is a service atom or service atom cluster that undergoes encoding processing, and the service atom cluster is a sequence formed by at least two service atoms arranged according to a sequence. The service atom is used to identify a service processing step required for processing the to-be-processed service flow. The encoding processing refers to that different binary digits or m-ary digits are used to indicate different service atoms or service atom clusters.

202. Receive the to-be-processed service flow and acquire a service routing table.

The acquiring a service routing table may be implemented in the following two manners, which specifically include the following steps.

Manner 1: Service routing table information sent by the controller is received, and a service routing table is generated according to the service routing table information.

The service routing table information is generated by the controller according to service processing path information, where the service processing path information is used to indicate a hop count required for processing the to-be-processed service flow, and a type and the number of service atoms involved in each hop.

Manner 2: A service routing table that has been stored in a service router is acquired.

The service routing table is pre-generated and stored in the service router, and may be any one of a centralized service routing table and a distributed service routing table.

For example, the centralized service routing table may include a service flow identifier, a processing sequence number of a service flow, an output port corresponding to the processing sequence number, and a next-hop service label corresponding to the processing sequence number, the distributed service routing table may include a service atom processing capability, an output port, and address information that are corresponding to a next-hop service processing device.

203. Process the to-be-processed service flow according to the business service information and the service routing table.

According to the service processing method provided by this embodiment of the present invention, a service processing sequence and a service processing type are identified by using a service atom or a service atom cluster, and business service information corresponding to the service atom or the service atom cluster is generated, so that a service router and a service server adjacent to the service router process a to-be-processed service flow according to the business service information. In a service processing manner provided by this embodiment, development of a new service changes into recombination of existing service atoms or adding of a new service atom, so that an operator may process a new service by using an existing device, and therefore service expansion can be performed without changing an original device of the operator.

Figure 3:
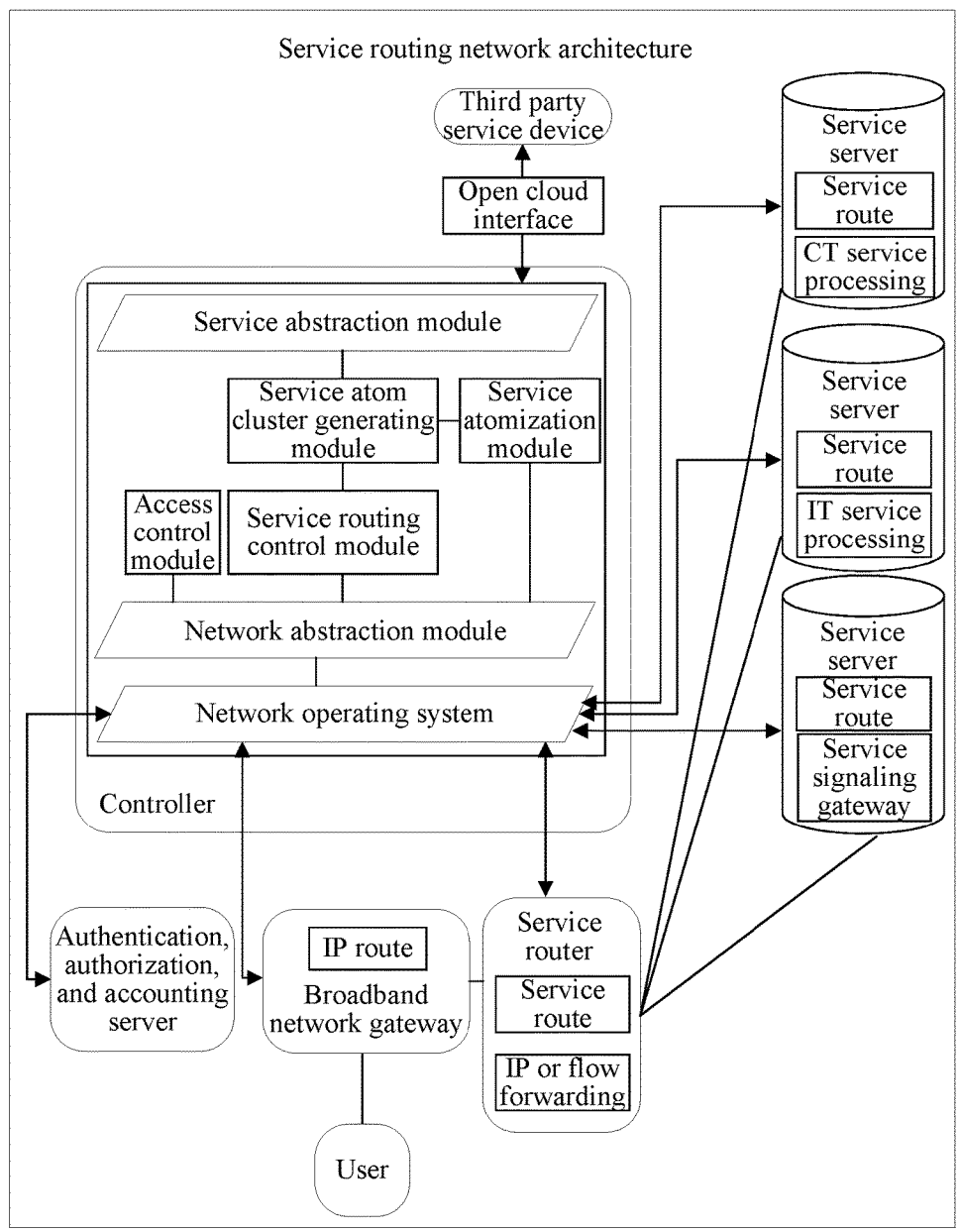
FIG. 3 is a composition block diagram of a service routing network architecture according to Embodiment 1 of the present invention.

This embodiment of the present invention further provides a service processing method, which may be applied in a service routing network architecture shown in FIG. 3, and the network architecture includes a controller, a broadband network gateway (BNG), a service router, a service server, and a third party service device. If a service server includes a service routing function, the service server changes into a service router.

The controller includes a network abstraction module, which is configured to abstract various network devices and servers such as a service router and a service server as a whole, so that for various control modules such as an access control module and a service routing control module, an abstract service routing virtual network is seen (that is, only a node that has a service routing function, and a node or a server that has a service processing capability are seen), which implements that physical hardware at a bottom layer is shielded, and device forms such as an access device, a router, and a switch are shielded. A service abstraction module is configured to abstract an editable service or network processing resource inside the controller as a service atom or a service atom cluster visible for a user, or an API (Application Programming Interface) that may be open to a third party. An open cloud interface, configured to provide the third party with a standard interface for cloud collaboration in aspects such as cloud management, cloud control, and cloud bearing, and the open cloud interface may be defined in a form of an open application programming interface (Open API) in this network architecture. For example, an Open API may be a service atom API or a service routing API, where the service atom API is configured to provide an interface for the third party to construct a service of the third party, and the service routing API is configured to provide an interface for the third party to construct a virtual service routing network of the third party.

There are various control modules between the foregoing network abstraction module and the foregoing service abstraction module, and the control modules include an access control module, configured to implement an access control function, such as user authentication and a Dynamic Host Configuration Protocol (DHCP) function. The access control module may be further configured to acquire business service information of a to-be-processed service flow. A service routing control module is configured to generate and maintain a service routing table, and generate service processing path information for a service flow according to a service atom or a service atom cluster corresponding to the service flow. A service atomization module, configured to register a service atom processing capability of a server. A service atom cluster generating (Service Chain Orchestration) module, configured to generate a service atom cluster according to information such as business service information, a service policy, and a user policy.

The service router in this embodiment may be configured to add, change, or delete a service label for a packet in a service flow, and forward the packet according to the service routing table. The service server in this embodiment may be configured to process a CT (Communication Technology) service and an IT (Information Technology) service, and provide a corresponding service atom processor, for example, a CT service atom processor or an IT service atom processor. The service server may be provided by a telecommunication operator, and may also be provided by a third party.

In this embodiment, the controller implements access control and service routing control.

Figure 4:
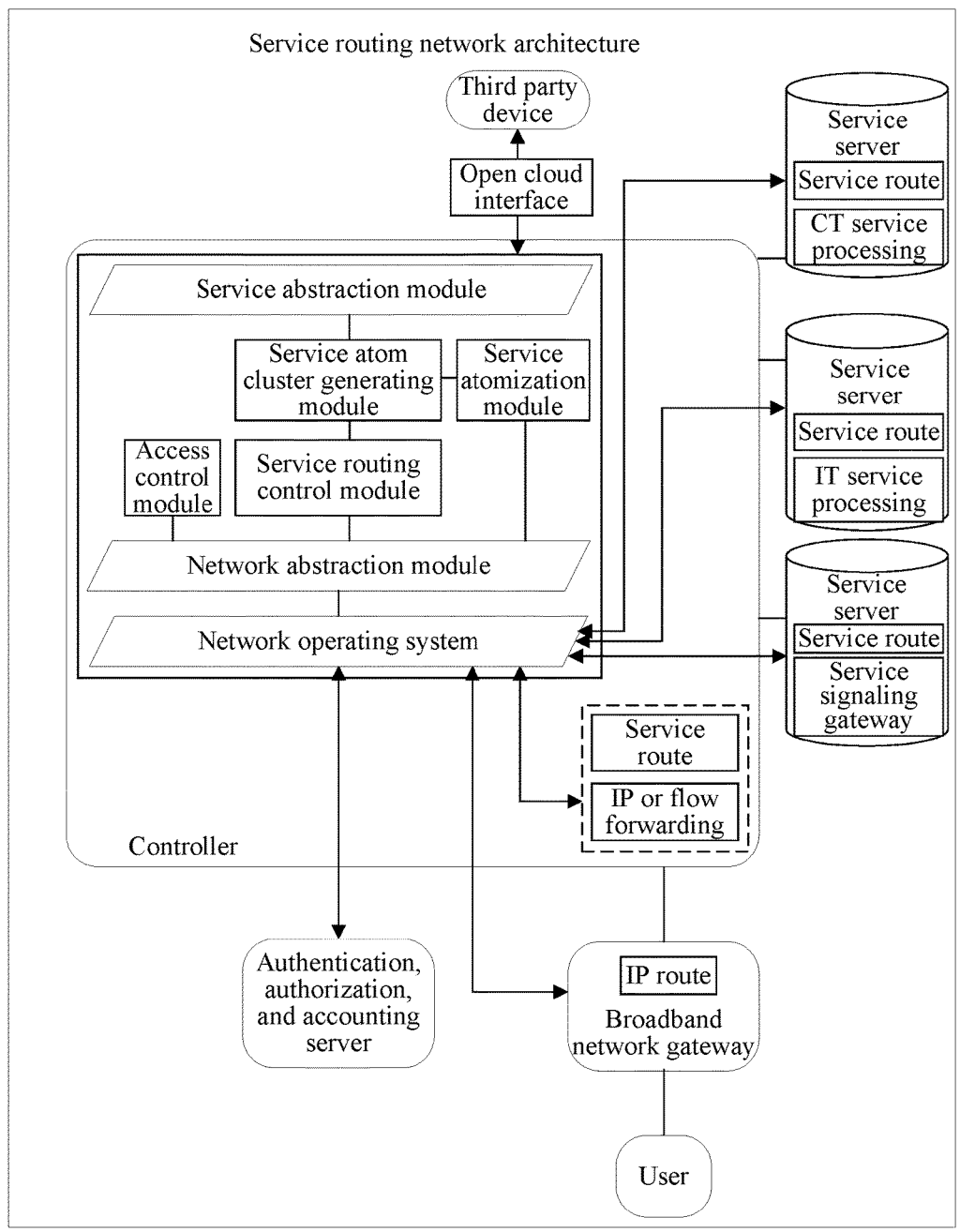
FIG. 4 is a composition block diagram of another service routing network architecture according to Embodiment 1 of the present invention.

For example, if the service router is used as a medium- or small-sized broadband service gateway, the controller may be built in the service router, and a service routing network architecture shown in FIG. 4 is formed, so that a network delay may be further reduced, performance is improved, and control is simplified.

It should be noted that the controller may have three control modes: a user authentication control mode, an associated control mode, and a signaling control mode. When processing a service flow, the service router may have two processing manners, which include a centralized service routing processing manner and a distributed service routing processing manner.

Figure 5:
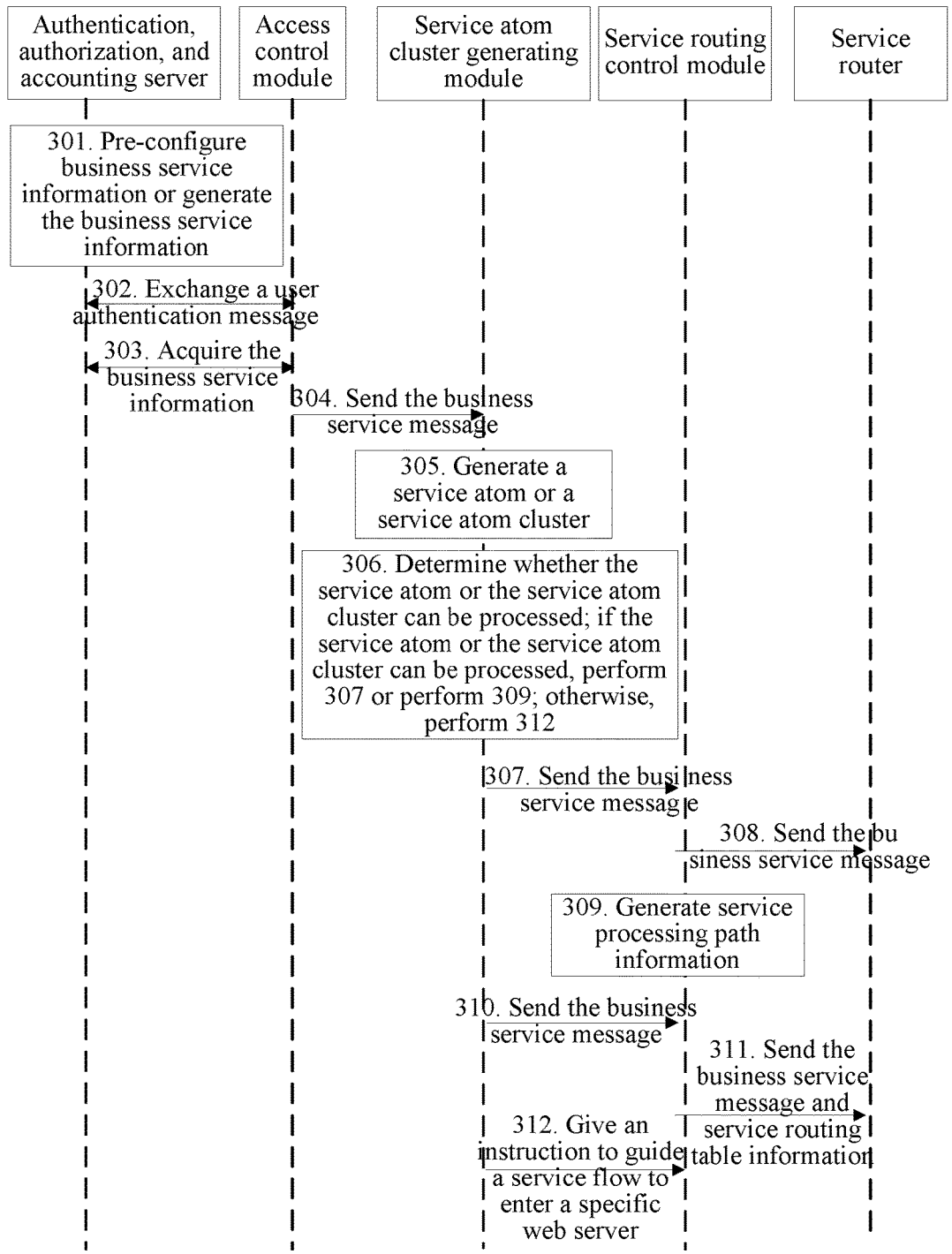
FIG. 5 is an information exchange diagram of a service processing procedure according to Embodiment 1 of the present invention.

Based on the foregoing described network architecture shown in FIG. 3, when the controller uses the user authentication control mode, this embodiment of the present invention provides a service processing method. As shown in FIG. 5, the method includes the following.

301. In an authentication, authorization, and accounting (AAA) server, business service information corresponding to a user is pre-configured; or a third party device invokes an Open API to generate the business service information corresponding to the user in the AAA server, where the business service information includes a service flow identifier corresponding to a to-be-processed service flow of the user and a service label corresponding to the service flow identifier.

A user may have multiple services, and a service flow corresponding to each service has its respective business service information.

302. An Access Control module is used as an AAA client or proxy to exchange a user authentication message with the AAA server. If the Access Control module receives a user authentication success message (for example, an access grant message of AAA) sent by the AAA server, perform step 303; otherwise, perform step 312.

A specific step of exchanging the user authentication message with the AAA server is a technology well known by a person skilled in the art, and is not described in detail in this embodiment of the present invention.

303. The Access Control module acquires the business service information corresponding to the user from the AAA server.

The business service information corresponding to the user may be carried in the user authentication message of the user. For example, the business service information corresponding to the user may be carried in an expanded access grant message of AAA, and the expansion, for example, may be implemented by adding a new attribute or option in the access grant message of AAA.

304. The Access Control module sends the business service information to a Service Chain Orchestration module.

305. The Service Chain Orchestration module decodes a service label in the business service information to obtain a corresponding service atom or service atom cluster.

306. The Service Chain Orchestration module determines, according to a service atom processing capability registered in a Service Atomization module, whether the service atom or the service atom cluster can be processed; if the service atom or the service atom cluster can be processed, when a service router processes a to-be-processed service flow in a distributed service routing processing manner, and a service routing table in the service router does not need to be generated according to service routing table information sent by the controller, perform step 307, and when the service router processes the to-be-processed service flow in a centralized service routing processing manner, or the service router processes the to-be-processed service flow in the distributed service routing processing manner and the service routing table in the service router needs to be generated according to the service routing table information sent by the controller, perform step 309; and if the service atom or the service atom cluster cannot be processed, perform step 312.

307. The Service Chain Orchestration module sends the business service information to a Service Routing Control module.

308. The Service Routing Control module delivers the business service information to an entry service router corresponding to the to-be-processed service flow, and ends a control procedure in the user authentication control mode.

309. The Service Routing Control module generates, according to the service atom processing capability registered in the Service Atomization module, service processing path information corresponding to the to-be-processed service flow.

The service processing path information is used to indicate, in a process of processing the to-be-processed service flow, a service router or a service server that the to-be-processed service flow needs to pass through according to a sequence, and service atoms, in the service atom cluster, that a service router or a service server at each hop needs to separately process according to a sequence.

310. The Service Chain Orchestration module sends the business service information to the Service Routing Control module.

311. The Service Routing Control module delivers the business service information to a first service router on a service processing path corresponding to the service processing path information, generates service routing table information corresponding to each service router on the service processing path corresponding to the service processing path information, delivers the service routing table information to a corresponding service router, and ends the control procedure in the user authentication control mode.

312. The Service Chain Orchestration module instructs the Service Routing Control module to guide the service flow to enter a specific Web Server, and the Web Server explains a reason to the user that why a corresponding service cannot be performed, and ends the control procedure in the user authentication control mode.

In this embodiment, by using the user authentication control mode, the controller may provide a corresponding service processing manner for a user after the user passes authentication, so that the user obtains a personalized service and user experience is improved. In the user authentication control mode, control and bearing are separated, and a service path is optimal. The mode can be better compatible with an existing Internet service and is more suitable for a user scenario of dynamic IP (Internet Protocol) address allocation.

Figure 6:
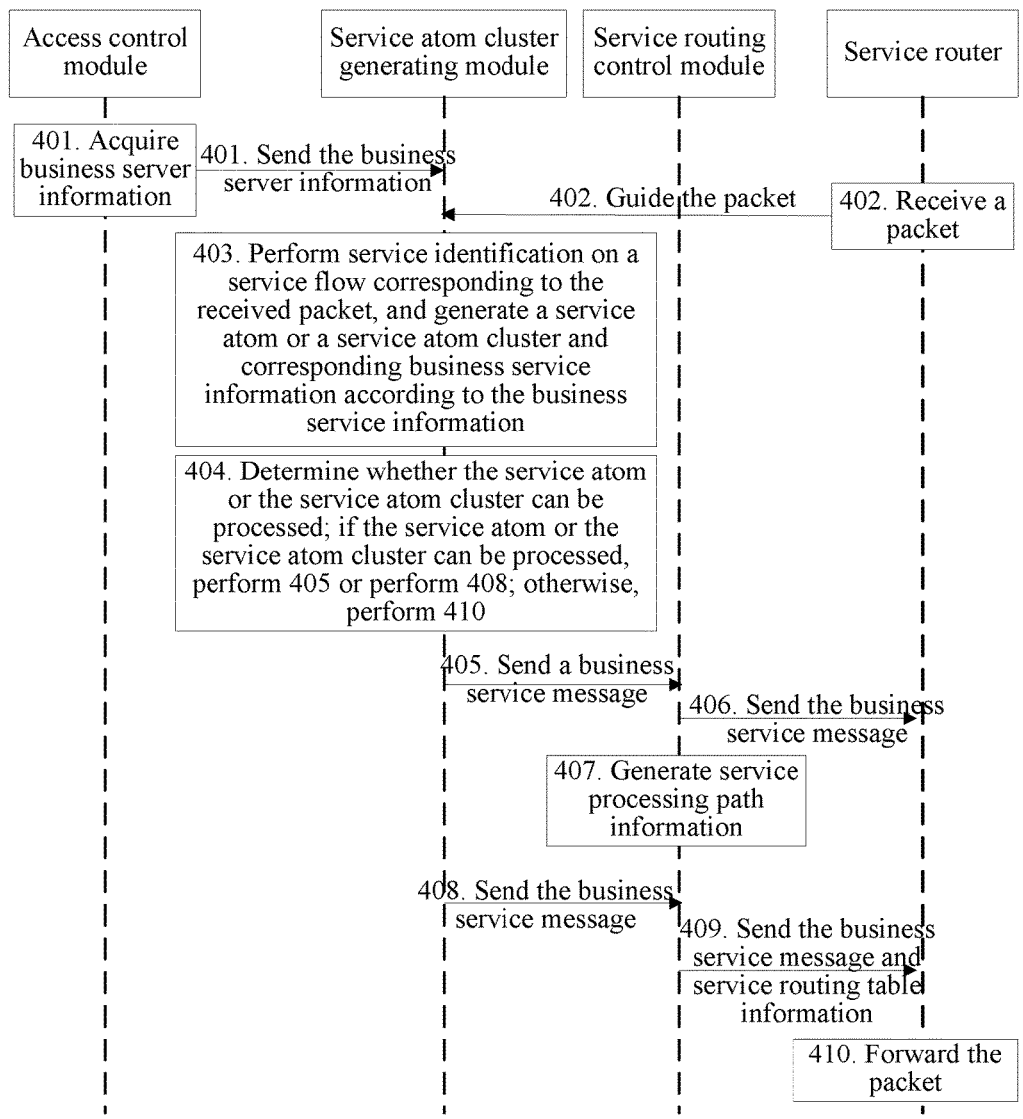
FIG. 6 is an information exchange diagram of another service processing procedure according to Embodiment 1 of the present invention.

Based on the foregoing described network framework shown in FIG. 3, when the controller uses the associated control mode (that is, a method in which service routing control is triggered by using a data packet), this embodiment of the present invention provides a service processing method. As shown in FIG. 6, the method includes the following steps.

401. An access control module acquires business service information corresponding to a to-be-processed service flow, and sends the business service information corresponding to the to-be-processed service flow to a Service Chain Orchestration module. The acquiring, by the Access Control module, the business service information corresponding to the to-be-processed service flow may be specifically: acquiring, by the Access Control module, business service information preset in the controller, and may also be: acquiring, by the Access Control module, business service information generated by a third party in the controller by invoking an Open API. A manner to be specifically used is not limited in this embodiment of the present invention. A definition of the business service information is the same as the foregoing definition.

402. A service router receives the to-be-processed service flow, and guides a first packet of the to-be-processed service flow or a packet, which cannot be identified by the service router, of the to-be-processed service flow to the Service Chain Orchestration module.

The packet, which cannot be identified by the service router, of the to-be-processed service flow is a packet in which routing information corresponding to the packet cannot be found in a routing table of the service router.

403. The Service Chain Orchestration module performs service identification on the to-be-processed service flow corresponding to the received packet, and generates, according to the business service information that is acquired by the Access Control module and corresponding to the to-be-processed service flow, a service atom or a service atom cluster corresponding to the to-be-processed service flow.

A relevant description of the business service information is the same as the foregoing relevant description.

404. The Service Chain Orchestration module determines, according to a registered service atom processing capability, whether the service atom or the service atom cluster can be processed; if the service atom or the service atom cluster can be processed, when the service router processes a service flow in a distributed service routing processing manner, and a service routing table in the service router does not need to be generated according to service routing table information sent by the controller, perform step 405, and when the service router processes the service flow in a centralized service routing processing manner, or the service router processes the service flow in the distributed service routing processing manner and the service routing table in the service router needs to be generated according to the service routing table information sent by the controller, perform step 407; and if the service atom or the service atom cluster cannot be processed, perform step 410.

405. The Service Chain Orchestration module sends the business service information to a Service Routing Control module.

406. The Service Routing Control module delivers the business service information to an entry service router corresponding to the to-be-processed service flow, and ends a control procedure in the associated control mode.

407. The Service Routing Control module generates service processing path information according to a service atom processing capability registered in a Service Atomization module.

A relevant description of the service processing path information is the same as the relevant description in the step 309.

408. The Service Chain Orchestration module sends the business service information to the Service Routing Control module.

409. The Service Routing Control module determines a first service router on a service processing path according to the service processing path information, delivers the business service information to the first service router, generates, according the service processing path information, service routing table information corresponding to each service router on the service processing path, delivers the service routing table information to a corresponding service router, and then ends the control procedure in the associated control mode.

410. The service router forwards the to-be-processed service flow out of a service routing network, and ends the control procedure in the associated control mode.

For example, the service router also has an ordinary forwarding capability. When the service atom or the service atom cluster corresponding to the to-be-processed service flow cannot be processed, ordinary forwarding is performed on the to-be-processed service flow, and the control procedure in the associated control mode is ended. The ordinary forwarding herein is forwarding performed based on header information, such as IP address information or other address information, of a service flow packet.

In this embodiment, by using the associated control mode, the controller may control and process data for which a corresponding service label is not set, which implements service processing of a majority of service flows and a special data packet. The mode can be better compatible with an existing Internet service, and may further support a scenario in which a home user or an enterprise user uses a static IP address.

Figure 7:
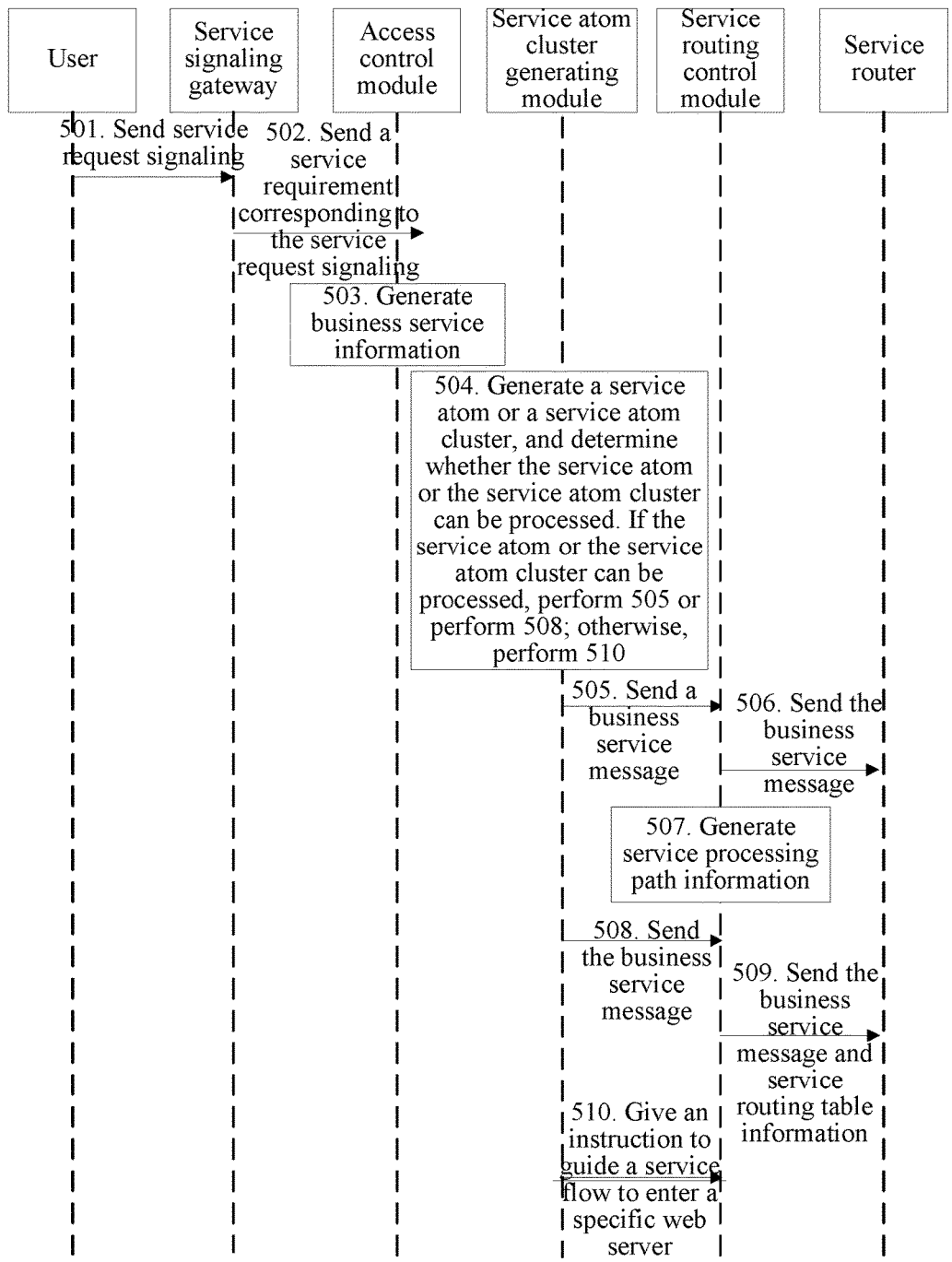
FIG. 7 is an information exchange diagram of still another service processing procedure according to Embodiment 1 of the present invention.

Based on the foregoing network framework shown in FIG. 3, when the controller uses the signaling control mode, this embodiment of the present invention provides a service processing method. As shown in FIG. 7, the method includes the following steps.

501. A service signaling gateway receives service request signaling sent by a user.

502. The Service Signaling Gateway sends an Access Control module a service requirement corresponding to the service request signaling sent by the user.

503. The Access Control module generates corresponding business service information according to the service requirement.

504. A Service Chain Orchestration module generates a corresponding service atom or service atom cluster according to the business service information, and determines, according to a service atom processing capability registered in a Service Atomization module, whether the service atom or the service atom cluster can be processed; if the service atom or the service atom cluster can be processed, when a service router processes a to-be-processed service flow in a distributed service routing processing manner, and a service routing table in the service router does not need to be generated according to service routing table information sent by the controller, perform step 505, and when the service router processes the to-be-processed service flow in a centralized service routing processing manner, or when the service router processes the to-be-processed service flow in the distributed service routing processing manner and the service routing table in the service router needs to be generated according to the service routing table information sent by the controller, perform step 508; otherwise, perform step 510.

505. The Service Chain Orchestration module sends the business service information to a Service Routing Control module.

506. The Service Routing Control module delivers the business service information to an entry service router corresponding to the service flow, and ends a control procedure in the signaling control mode.

507. The Service Routing Control module generates service processing path information according to the registered service atom processing capability.

A relevant description of the service processing path information is the same as the relevant description in the step 309.

508. The Service Chain Orchestration module sends the business service information to the Service Routing Control module.

509. The Service Routing Control module determines a first service router on a service processing path according to the service processing path information, delivers the business service information to the service router, generates, according the service processing path information, service routing table information corresponding to each service router on the service processing path, delivers the service routing table information to a corresponding service router, and ends the control procedure in the signaling control mode.

510. The Service Chain Orchestration module instructs the Service Routing Control module to guide the service flow to enter a specific Web Server, and the Web Server explains a reason to the user that why a corresponding service cannot be performed, and ends the control procedure in the signaling control mode.

In this embodiment, by using the signaling control mode, the controller may process, by using a service atom, a service, such as a voice service, of a type that a service is initiated by using signaling, which improves serviceability of the service atom and reduces a development cost of an operator. The mode requires a user terminal to be capable of initiating service-related signaling, which is relatively suitable for a VoIP (Voice over Internet Protocol) service or another service (such as a Peer-to-Peer service) that supports signaling.

For example, in this embodiment, after the controller ends the control procedure, the service router may process, according to the centralized service routing processing manner or the distributed service routing processing manner, the to-be-processed service flow.

In the service routing network architecture shown in FIG. 3, when the service router and the service server are connected in a star topology, the centralized service routing processing manner may be used. In a network connection structure shown in FIG. 8, a controller may be disposed in a service router, and may also be disposed outside the service router and connect to the service router. The service router and the service server are mutually independent; all service servers connect to the service router, and data exchange may be performed; the service servers do not connect to each other, so that a star topology connection is presented between the service router and the service servers.

An upstream device and a downstream device may be a service router or another network device that can send a packet, and are not listed one by one herein in this embodiment of the present invention.

Figure 8:
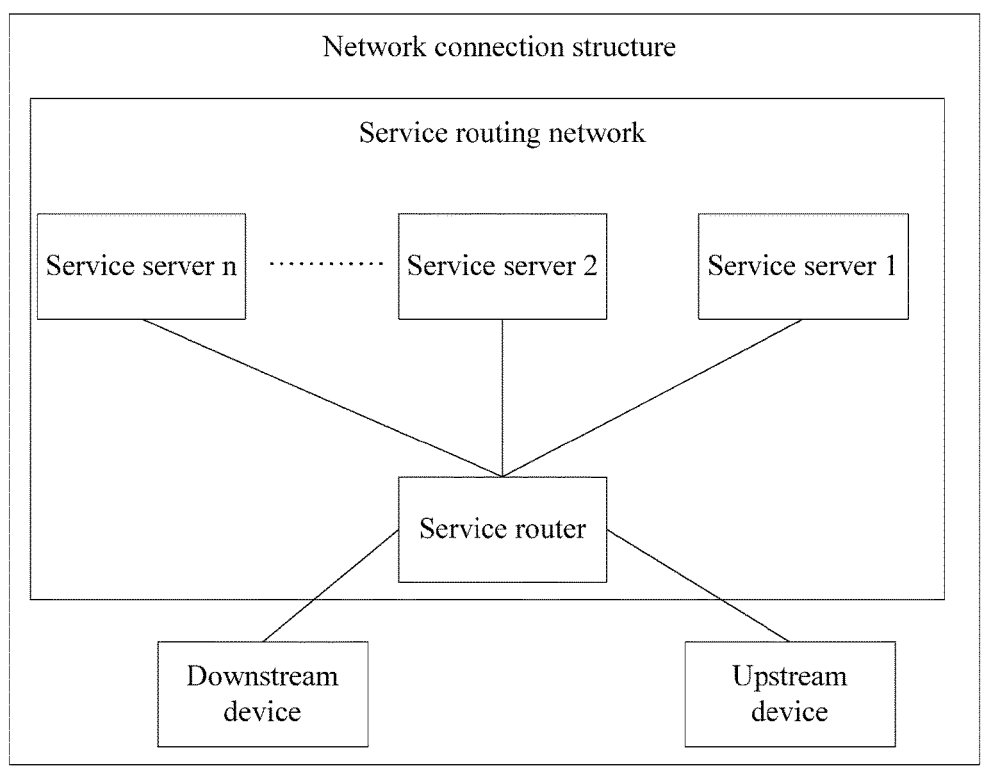
FIG. 8 is a block diagram of a network connection structure according to Embodiment 1 of the present invention.
Figure 9:
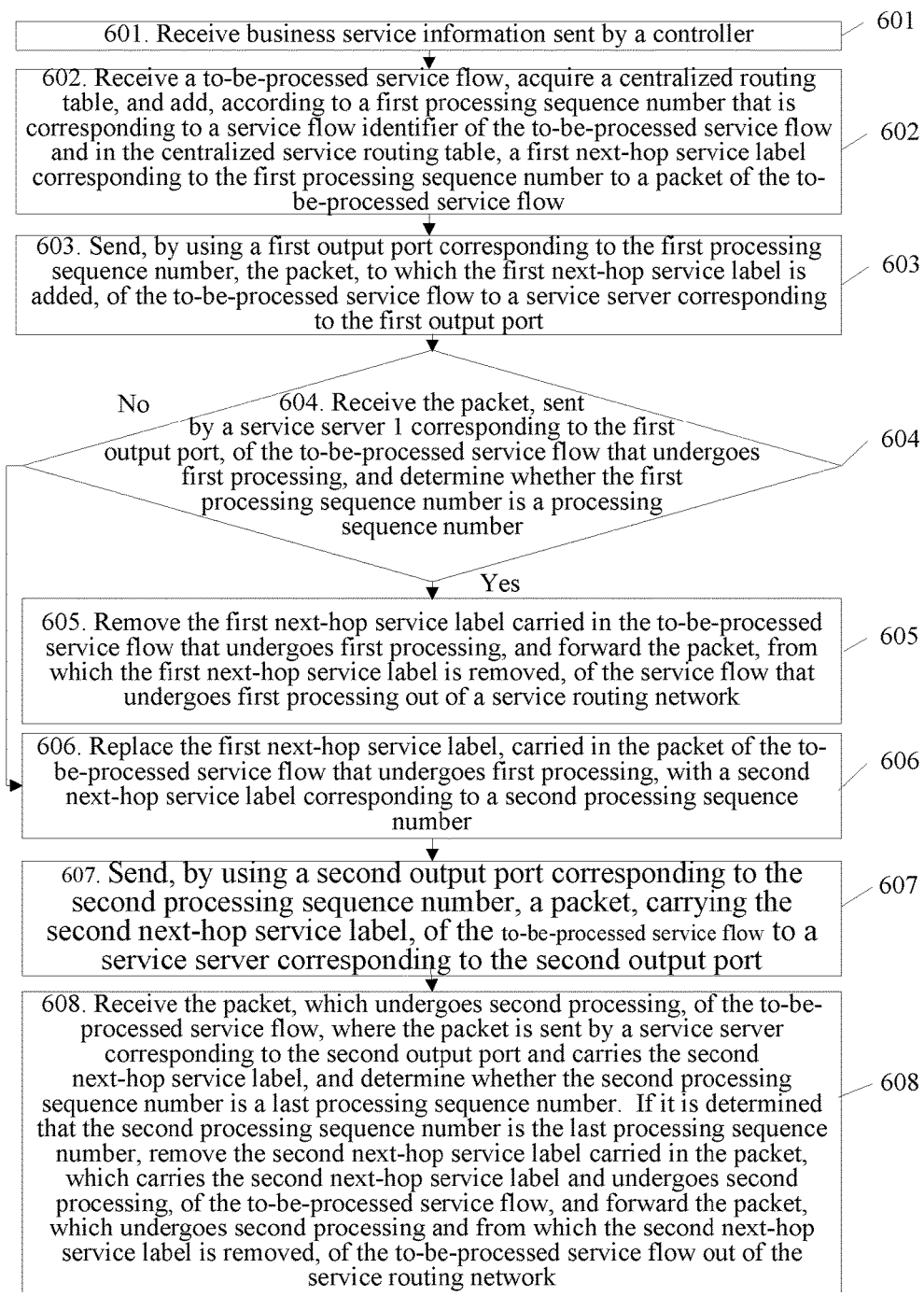
FIG. 9 is a flowchart of a service processing method according to Embodiment 1 of the present invention.

Based on the network connection structure shown in FIG. 8, FIG. 9 shows specific steps of the centralized service routing processing manner, and the specific steps include the following.

601. A service router receives business service information sent by a controller, where the business service information includes a service flow identifier of a to-be-processed service flow and a service label corresponding to the service flow identifier.

602. The service router receives the to-be-processed service flow and acquires a centralized service routing table, and adds, according to a first processing sequence number that is corresponding to the service flow identifier of the to-be-processed service flow and in the centralized service routing table, a first next-hop service label corresponding to the first processing sequence number to a packet of the to-be-processed service flow. The acquiring the service routing table may be generating, by receiving service routing table information sent by the controller, the service routing table according to the service routing table information, or may be acquiring a service routing table configured in the service router.

The following Table 1 shows the centralized service routing table.

TABLE 1

| Centralized service routing table | | | |
| --- | --- | --- | --- |
| Service Flow Identifier | Processing Sequence Number | Output Port | Next-hop Service Label |
| 000001 | 1 | 1 | 54321 |
| | 2 | 2 | 12345 |
| | 3 | 3 | 11111 |

It should be noted that Table 1 is only a centralized service routing table, in a single controller, generated and maintained by a Service Routing Control module, and different controllers need to generate and maintain their respective centralized service routing tables. Content in Table 1 is only used as an example, and specific implementation needs to be set according to an actual situation and a demand.

The service label is obtained by encoding a service atom or a service atom cluster, and a specific encoding manner is not limited herein; all realizable encoding manners in the prior art may be applied in this embodiment of the present invention. For example, in Table 1, service labels 54321, 12345, and 11111 are respectively corresponding to three different service atoms A, B, and C; A, B, and C respectively represent three different service processing operations, and a combination of the three different service processing operations according to a sequence of ABC is a service processing process required for processing the service flow.

The following Table 2 is a setting instance of a service label when a service flow is transmitted in a pseudo-wire (PW). A flow label is used to identify the service flow, which may avoid flow classification made by a node subsequently, and even may avoid making service identification. The service label is the same with the foregoing definition, and is a service atom or service atom cluster that undergoes encoding processing, where the service atom cluster is a sequence formed by at least two service atoms arranged according to a sequence.

TABLE 2

| Internal structure of a service flow packet, in the pseudo-wire, to which a service label is added |
| --- |
| Payload |
| PW control word |
| Service label |
| Flow label |
| PW label |
| MPLS tunnel label |

The service label may also be set at a data link layer; for example, a service label is added inside an Ethernet packet, and a virtual local area network (VLAN) identifier may be used as a service label. MPLS is Multi-Protocol Label Switching, multi-protocol label switching.

603. The service router sends, by using a first output port (output port 1) corresponding to the first processing sequence number, the packet, to which the first next-hop service label is added, of the to-be-processed service flow to a service server 1 corresponding to the first output port, so that the service server 1 corresponding to the first output port processes the packet of the to-be-processed service flow according to the first next-hop service label.

604. The service router receives the packet, sent by the service server 1 corresponding to the first output port, of the to-be-processed service flow that undergoes first processing, and determines whether the first processing sequence number is a processing sequence number. If it is determined that the first processing sequence number is a last processing sequence number, perform step 605; otherwise, perform step 606.

605. The service router removes the first next-hop service label carried in the to-be-processed service flow that undergoes first processing, and forwards the packet, from which the first next-hop service label is removed, of the service flow that undergoes first processing out of a service routing network.

606. The service router replaces the first next-hop service label, carried in the packet of the to-be-processed service flow that undergoes first processing, with a second next-hop service label corresponding to a second processing sequence number.

The second processing sequence number is a second processing sequence number, in the centralized service routing table shown in Table 1, in a column in which the processing sequence number is located.

607. The service router sends, by using a second output port corresponding to the second processing sequence number, a packet, carrying the second next-hop service label, of the to-be-processed service flow to a service server 2 corresponding to the second output port, so that the service server 2 corresponding to the second output port processes, according to the second next-hop service label, the packet, carrying the second next-hop service label, of the to-be-processed service flow.

608. The service router receives the packet, which undergoes second processing, of the to-be-processed service flow, where the packet is sent by the service server 2 corresponding to the second output port and carries the second next-hop service label, and determines whether the second processing sequence number is the last processing sequence number. If it is determined that the second processing sequence number is the last processing sequence number, the service router removes the second next-hop service label carried in the packet, which carries the second next-hop service label and undergoes second processing, of the to-be-processed service flow, and forwards the packet, which undergoes second processing and from which the second next-hop service label is removed, of the to-be-processed service flow out of the service routing network.

It should be noted that, in the step 608, if it is determined that the second processing sequence number is still not the last processing sequence number, continue to perform a procedure described in steps 606 to 6008 until all service atoms in the service label corresponding to the to-be-processed service flow are processed completely in proper sequence.

In the service routing network architecture shown in FIG. 3, if functions respectively corresponding to the service router, the controller, and the service server are integrated on a same device, the device becomes a service processing device. In this case, service processing devices may be connected together by using a network connection structure shown in FIG. 10, so that a distributed service routing processing manner may be used. In the network connection structure shown in FIG. 10, each service processing device can receive a packet or send a packet; each two service processing devices may connect to each other and can perform data exchange.

Figure 10:
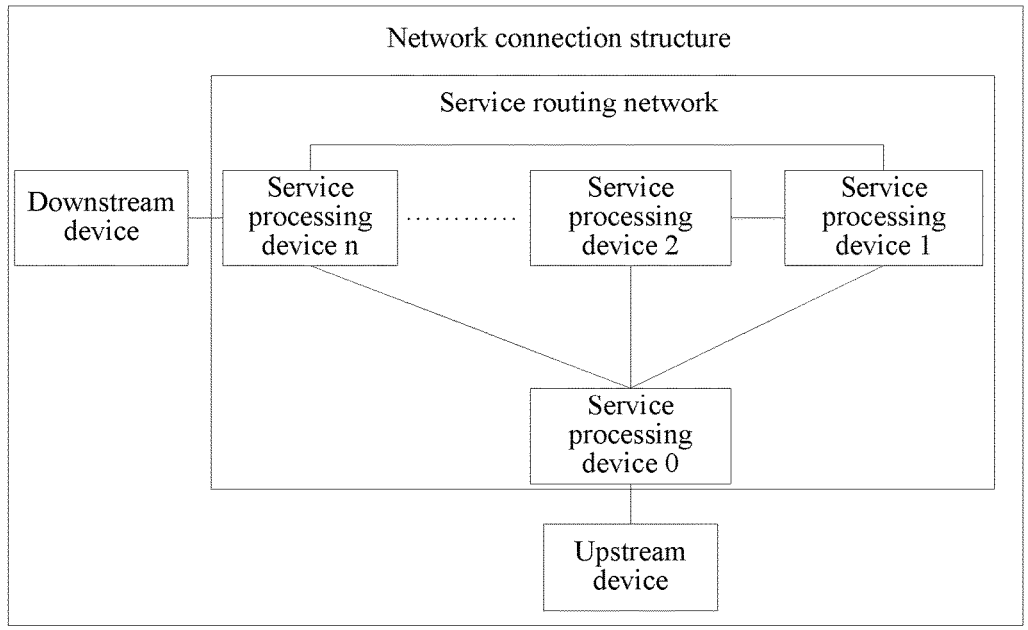
FIG. 10 is a block diagram of another network connection structure according to Embodiment 1 of the present invention.

An upstream device and a downstream device shown in FIG. 10 may be a service router or another network device that can send a packet, and may have a connection relationship and a data exchange capability with all service processing devices. The network connection structure shown in FIG. 10 is only schematic, and a specific connection manner is not limited in this embodiment of the present invention.

Figure 11:
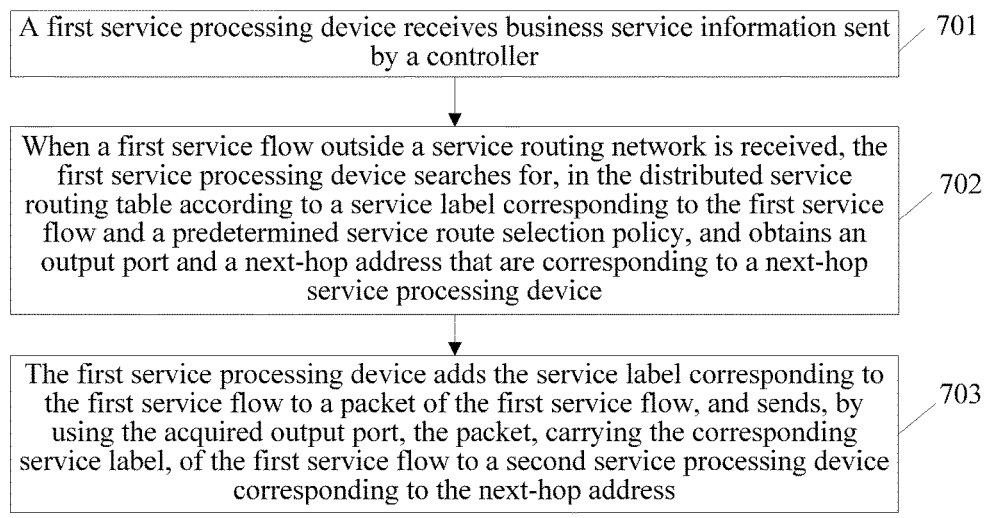
FIG. 11 is a flowchart of another service processing method according to Embodiment 1 of the present invention.

Based on the network connection structure shown in FIG. 10, FIG. 11 shows specific steps of the distributed service routing processing manner, and the specific steps include the following.

701. A first service processing device (a service processing device 0 in FIG. 10) receives business service information sent by a controller, where the business service information includes a service flow identifier of a first service flow and a service label corresponding to the service flow identifier.

Acquiring a distributed service routing table may be generating, by receiving service routing table information sent by the controller, the distributed service routing table according to the service routing table information, or directly acquiring a service routing table configured in a service router. The first service flow is a to-be-processed service flow.

A distributed service routing table on the first service processing device is used as an example, and the distributed service routing table may be shown in Table 3.

A next-hop address may be an address of a service processing device, and may also be an address of a virtual machine of the service processing device; an IP address may be used, and other information that has an address identification function may also be used, which is not limited in this embodiment of the present invention. A next-hop service atom processing capability, for example, may be indicated by using a service atom or a service atom cluster. The service processing device may be virtualized into multiple service servers (that is, virtual machines).

TABLE 3

Service routing table of the first service processing device

| Next-hop Service Atom Processing Capability | Output Port | Next-hop Address |
|---|---|---|
| A | 4 | Address of a service processing device 4 |
| BC | 3 | Address of a service processing device 3 |
| CB | 3 | Address of the service processing device 3 |
| B | 3 | Address of the service processing device 3 |
| C | 3 | Address of the service processing device 3 |
| B | 2 | Address of a service processing device 2 |
| D | 1 | Address of a service processing device 1 |

It should be noted that the distributed service routing table may be obtained by the service processing device by receiving the service routing table information sent by the controller, and the distributed service routing table may also be acquired by the service processing device by learning a service atom or service atom cluster processing capability of an adjacent service processing device, or the distributed service routing table is generated according to a locally configured service atom processing capability of an adjacent node.

For example, the acquiring the distributed service routing table by the service processing device by learning the service atom or service atom cluster processing capability of the adjacent service processing device may specifically include acquiring, by the service processing device and from a received message multicast or broadcast by the adjacent service processing device, a service atom processing capability corresponding to the adjacent service processing device and address information corresponding to the adjacent service processing device; and generating the distributed service routing table according to the service atom processing capability corresponding to the adjacent service processing device, the address information corresponding to the adjacent service processing device, and information of an output port connected to the adjacent service processing device.

Further, after the distributed service routing table is generated, the service processing device may still notify its service atom processing capability by periodically broadcasting or multicasting, and receive a multicast or broadcast message sent by the adjacent service processing device. If a service atom processing capability notified by a new service processing device is received, a new entry is added into an existing distributed service routing table according to the service atom processing capability corresponding to the new service processing device and address information of the new service processing device. If a new service atom processing capability notified by an adjacent service router, a corresponding entry, in the distributed service routing table, of the adjacent service processing device is updated according to the new service atom processing capability. Optionally, if no service atom processing capability notified by the adjacent service processing device is received in a time, an entry that is corresponding to the adjacent service router and in the distributed service routing table may be deleted.

It should be noted that, for generating the distributed service routing table according to the locally configured service atom processing capability of the adjacent node, it is unnecessary for the service processing device to acquire a service atom processing capability of another service processing device by itself; instead, the distributed service routing table is generated according to a service atom processing capability, locally pre-configured in the service processing device, of an adjacent service processing device. The pre-configured service atom processing capability of the adjacent service processing device, for example, may be configured by network maintenance personnel or other personnel.

702. When the first service flow outside a service routing network is received, the first service processing device searches for, in the distributed service routing table according to the service label corresponding to the first service flow and a predetermined service route selection policy, and obtains an output port and a next-hop address that are corresponding to a next-hop service processing device; for example, a service processing device corresponding to the next-hop address is a second service processing device (a service processing device 1 in FIG. 10).

The predetermined service route selection policy includes a longest prefix matching policy and an optimal service feature matching policy.

For example, the longest prefix matching policy may be understood as follows. If a service atom cluster corresponding to the to-be-processed service flow is ABCD, according to the distributed service routing table of Table 3, a service processing device corresponding to an output port 4 should be selected, because the service processing device corresponding to the output port 4 may process a service atom A; when a service atom cluster corresponding to the service flow is BCAD, according to content displayed in the distributed service routing table of Table 3, a service processing device corresponding to an output port 3 should be selected, because the service processing device corresponding to the output port 3 may process a service atom combination BC. Compared with a service processing device corresponding to an output port 2, a service atom C can further be consecutively processed.

For example, the optimal service feature matching policy may be understood as selecting a route with a lowest routing cost. For example, when the service atom cluster corresponding to the service flow is BCAD, according to the content displayed in the distributed service routing table of Table 3, a route whose output port is 3 should be selected; however, if a routing cost of the service processing device corresponding to the output port 3 is higher, for example, a transmission delay is larger, and in this case, a route that is corresponding to the output port 2 and whose routing cost is lower may be selected.

703. The first service processing device adds the service label corresponding to the first service flow to a packet of the first service flow, and sends, by using the acquired output port, the packet, carrying the corresponding service label, of the first service flow to the second service processing device (the service processing device 1 in FIG. 10) corresponding to the next-hop address, so that the second service processing device processes the service flow packet according to a service atom processing capability of the second service processing device.

Further, the first service processing device may further receive a second service flow sent by the adjacent service processing device, acquires a service label in the second service flow and decodes the service label into a corresponding service atom or service atom cluster, and processes the second service flow according to the corresponding service atom or service atom cluster.

Optionally, the second service processing device receives a service flow packet sent by the first service processing device, and the service flow packet carries a service label corresponding to the service flow; the second service processing device processes the service flow packet according to a registered service atom processing capability; and the second service processing device deletes a processed service atom from a service atom cluster corresponding to the service label, and then determines whether there is a remaining service atom in the service atom cluster. If it is determined that there is a remaining service atom, the service label in the service flow packet is replaced with a new service label from which the service atom is deleted, and an output port and a corresponding next-hop address are searched for in the distributed service routing table according to the new service label and optionally according to the predetermined service route selection policy, the second service processing device sends, by using the found output port, a service flow packet carrying the new service label to a third service processing device (such as the service processing device 2) corresponding to the next-hop address, so that the third service processing device processes the service flow according to a service atom processing capability of the third service processing device. The deleting the processed service atom from the service atom cluster corresponding to the service label is, for example, when a service label of the service flow is ABCD, and the service processing device 2 processes a service atom A, deleting the service atom A in the service label ABCD, and generating a new service label BCD.

If it is determined that there is no remaining service atom, the second service processing device forwards the service flow packet out of the service routing network.

Two data processing manners provided in this embodiment may be applied in different network scenarios, which increases a usage scope of this embodiment of the present invention, and improves expansibility of a service.

According to the service processing method provided by this embodiment of the present invention, a service processing sequence is identified by using a service atom or a service atom cluster, and business service information corresponding to the service atom or the service atom cluster is generated, so that a service router and a service server adjacent to the service router process a to-be-processed service flow according to the business service information. In a service processing manner provided by this embodiment, development of a new service changes into recombination of existing service atoms or adding of a new service atom, so that an operator may proceed to process a service by still using an existing device, and therefore service expansion can be performed without changing an original device of the operator.

Embodiment 2

Figure 12:
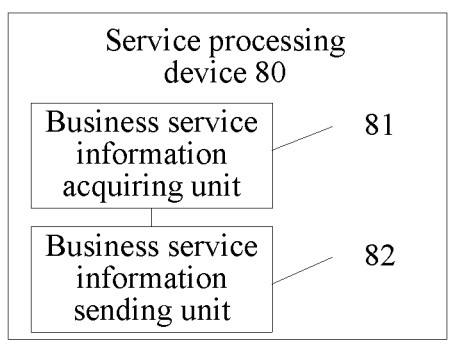
FIG. 12 is a composition block diagram of a service processing device according to Embodiment 2 of the present invention.

This embodiment of the present invention provides a service processing device 80, and the service processing device 80, for example, may be the controller in Embodiment 1. As shown in FIG. 12, the device includes a business service information acquiring unit 81 configured to acquire business service information corresponding to a to-be-processed service flow, where the business service information includes a service flow identifier of the to-be-processed service flow and a service label corresponding to the service flow identifier. A business service information sending unit 82 is configured to send the business service information corresponding to the to-be-processed service flow to a service router, so that the service router processes, according to the business service information, the to-be-processed service flow. The service label is a service atom that undergoes encoding processing or a service atom cluster that undergoes encoding processing.

Figure 13:
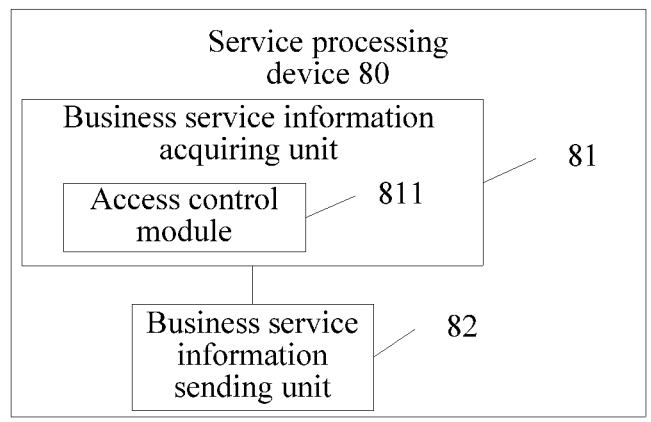
FIG. 13 is a composition block diagram of another service processing device according to Embodiment 2 of the present invention.

For example, as shown in FIG. 13, the business service information acquiring unit 81 includes an access control module 811, and the access control module 811 is configured to acquire, from an authentication, authorization, and accounting server, the business service information corresponding to the to-be-processed service flow.

For example, the business service information acquiring unit 81 includes the access control module 811, and the access control module 811 may be configured to acquire business service information that is preset in a controller and corresponding to the to-be-processed service flow.

For example, the business service information acquiring unit 81 includes the access control module 811, and the access control module 811 is configured to receive a service requirement sent by a service signaling gateway, where the service requirement is a service requirement corresponding to service request signaling that is sent by a user and received by the service signaling gateway, and the access control module 811 generates, according to the service requirement, the business service information corresponding to the to-be-processed service flow.

Figure 14:
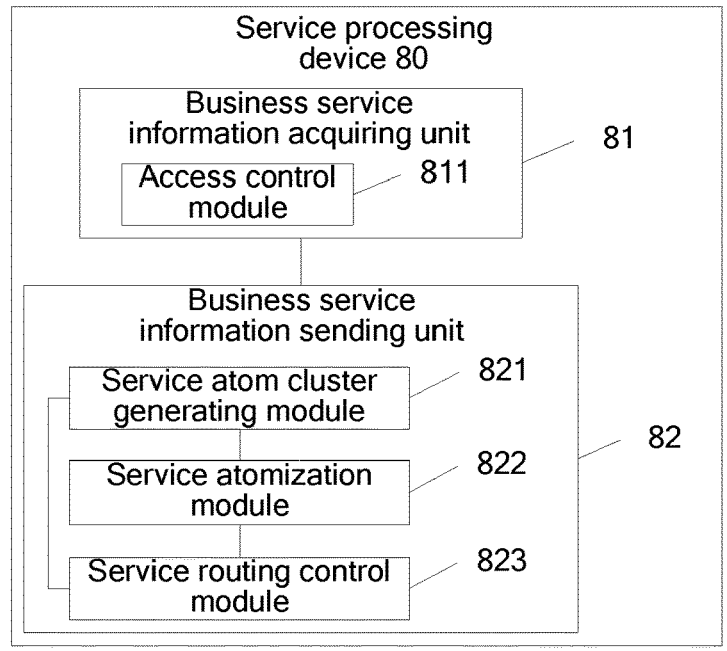
FIG. 14 is a composition block diagram of another service processing device according to Embodiment 2 of the present invention.

For example, as shown in FIG. 14, the business service information sending unit 82 specifically includes a service atom cluster generating module 821, a service atomization module 822, and a service routing control module 823, where the service atom cluster generating module 821 is configured to generate a service atom or a service atom cluster corresponding to the service label, and determine, according to a service atom processing capability registered in the service atomization module 822, whether the service atom or the service atom cluster can be processed; and if the service atom or the service atom cluster can be processed, when the service router processes the to-be-processed service flow in a distributed service routing processing manner, and a service routing table in the service router does not need to be generated according to service routing table information sent by the controller, the service atom cluster generating module sends the business service information to the service routing control module 823, and the service routing control module 823 delivers the business service information to an entry service router corresponding to the to-be-processed service flow.

For example, when the service router processes the to-be-processed service flow in a centralized service routing processing manner, or when the service router processes the to-be-processed service flow in the distributed service routing processing manner and the service routing table in the service router needs to be generated according to the service routing table information sent by the service processing device, the service routing control module 823 generates, according to the service atom processing capability registered in the service atomization module 822, service processing path information corresponding to the to-be-processed service flow; the service atom cluster generating module 821 sends the business service information to the service routing control module 823; and the service routing control module 823 delivers the business service information to a first service router on a service processing path corresponding to the service processing path information, generates service routing table information corresponding to each service router on the service processing path corresponding to the service processing path information, and delivers the service routing table information to a corresponding service router.

For example, if it is determined that the service atom or the service atom cluster cannot be processed, the service atom cluster generating module 821 is further configured to send the to-be-processed service flow to a network server, so that the network server notifies a user that the to-be-processed service flow cannot be processed currently.

Figure 15:
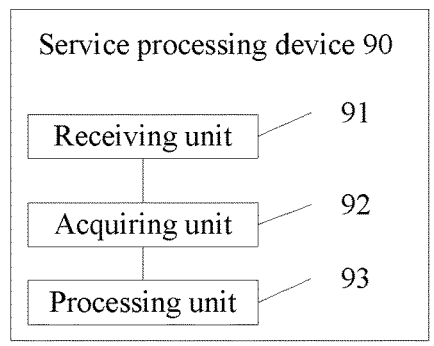
FIG. 15 is a composition block diagram of another service processing device according to Embodiment 2 of the present invention.

This embodiment of the present invention further provides another service processing device 90, and the service processing device 90, for example, may be the service processing device or the service router in Embodiment 1. As shown in FIG. 15, the service processing device 90 includes a receiving unit 91 configured to receive business service information sent by a controller, where the business service information includes a service flow identifier and a service label of a first service flow. The receiving unit 91 is further configured to receive the first service flow. An acquiring unit 92 is configured to acquire a service routing table. A processing unit 93 is configured to process the first service flow according to the business service information and the service routing table.

Figure 16:
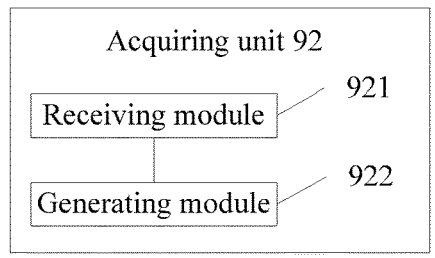
FIG. 16 is a composition block diagram of another service processing device according to Embodiment 2 of the present invention.
Figure 17:
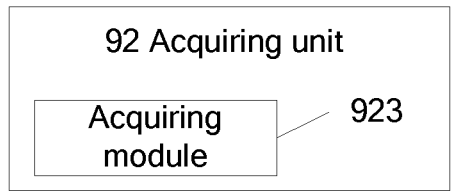
FIG. 17 is a composition block diagram of another service processing device according to Embodiment 2 of the present invention.
Figure 18:
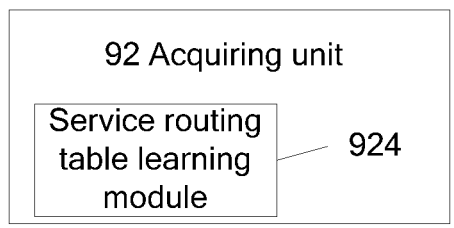
FIG. 18 is a composition block diagram of another service processing device according to Embodiment 2 of the present invention.

For example, as shown in FIG. 16, the acquiring unit 92 includes a receiving module 921, configured to receive service routing table information sent by the controller. A generating module 922 is configured to generate the service routing table according to the service routing table information. Alternatively, as shown in FIG. 17, the acquiring unit 92 includes an acquiring module 923, which is configured to directly acquire a service routing table that has been stored in the service processing device. Alternatively, as shown in FIG. 18, the acquiring unit 92 includes a service routing table learning module 924, which is configured to acquire a distributed service routing table by learning a service atom or service atom cluster processing capability of an adjacent service processing device.

Figure 19:
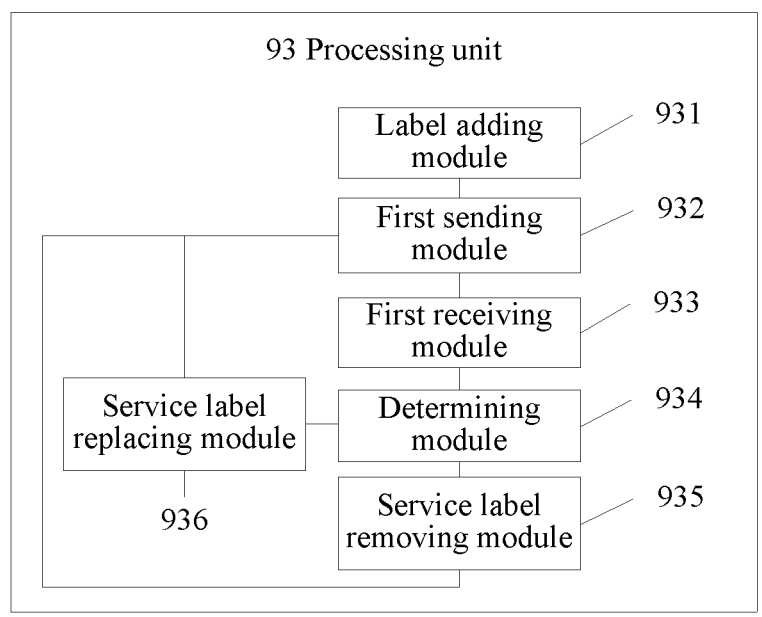
FIG. 19 is a composition block diagram of another service processing device according to Embodiment 2 of the present invention.

For example, as shown in FIG. 19, the processing unit 93 includes a label adding module 931 configured to, when a service routing table acquired by the acquiring unit is a centralized service routing table, add, according to a first processing sequence number that is corresponding to the service flow identifier of the first service flow and in the centralized service routing table, a first next-hop service label corresponding to the first processing sequence number to a packet of the first service flow.

A first sending module 932 is configured to send, by using a first output port corresponding to the first processing sequence number, the packet, to which the first next-hop service label is added, of the first service flow to a service server corresponding to the first output port, so that the service server corresponding to the first output port processes the first service flow according to the first next-hop service label.

A first receiving module 933 is configured to receive the first service flow that is sent by the service server corresponding to the first output port and undergoes first processing.

A determining module 934, configured to determine whether the first processing sequence number is a last processing sequence number that is corresponding to the service flow identifier and in the service routing table.

A service label removing module 935 is configured to, if it is determined that the first processing sequence number is the last processing sequence number that is corresponding to the service flow identifier and in the service routing table, remove the first next-hop service label in the first service flow that undergoes processing. The first sending module 932 is further configured to forward the packet, from which the first next-hop service label is removed, of the first service flow out of a service routing network.

A service label replacing module 936 is configured to, if it is determined that the first processing sequence number is not the last processing sequence number that is corresponding to the service flow identifier and in the service routing table, replace the first next-hop service label in the first service flow that undergoes processing with a second next-hop service label corresponding to a second processing sequence number that is corresponding to the service flow identifier and in the service routing table.

The first sending module 932 is further configured to send, by using a second output port corresponding to the second processing sequence number, a packet, carrying the second next-hop service label, of the first service flow to a service server corresponding to the second output port, so that the service server corresponding to the second output port processes, according to the second next-hop service label, the packet, carrying the second next-hop service label, of the first service flow.

The first receiving module 933 is further configured to receive the packet, which undergoes processing, of the first service flow, where the packet is sent by the service server corresponding to the second output port and carries the second next-hop service label.

The determining module 934 is further configured to determine whether the second processing sequence number is the last processing sequence number that is corresponding to the service flow identifier and in the service routing table.

The service label removing module 935 is further configured to, if it is determined that the second processing sequence number is the last processing sequence number that is corresponding to the service flow identifier and in the service routing table, remove the second next-hop service label carried in the packet, which carries the second next-hop service label and undergoes processing, of the first service flow.

The first sending module 932 is configured to forward the packet, from which the second next-hop service label is removed, of the first service flow out of the service routing network.

Figure 20:
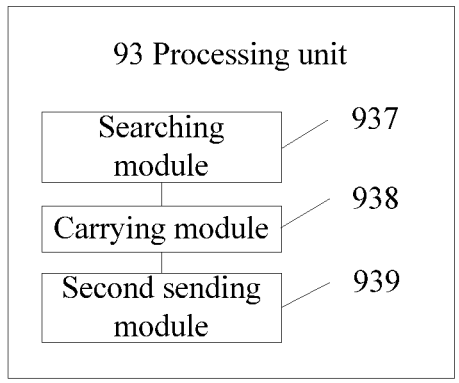
FIG. 20 is a composition block diagram of another service processing device according to Embodiment 2 of the present invention.

For example, as shown in FIG. 20, the processing unit 93 further includes a searching module 937 configured to, when the acquired service routing table is a distributed service routing table, search for, in the distributed service routing table according to the service label and a predetermined service route selection policy, and obtain a third output port and address information that are corresponding to a next-hop service processing device. A carrying module 938 is configured to carry the service label in the first service flow. A second sending module 939, configured to send the first service flow to the next-hop service processing device by using the third output port, so that the next-hop service processing device processes the to-be-processed service flow according to a service atom processing capability of the next-hop service processing device.

Figure 21:
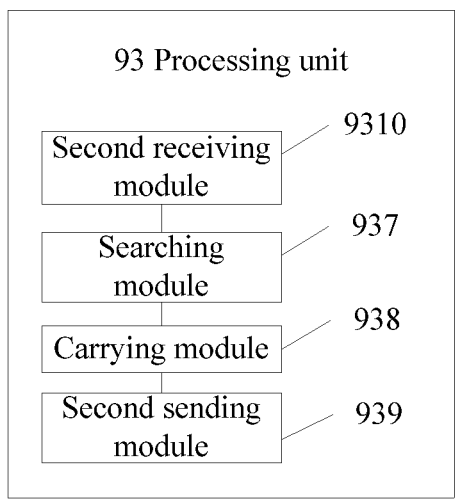
FIG. 21 is a composition block diagram of another service processing device according to Embodiment 2 of the present invention.

For example, as shown in FIG. 21, the processing unit 93 further includes a second receiving module 9310 configured to receive a second service flow sent by an adjacent service processing device, acquire a service label in the second service flow and decode the service label into a corresponding service atom or service atom cluster, and process the second service flow according to the corresponding service atom or service atom cluster.

Figure 22:
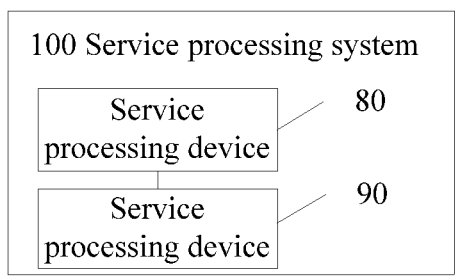
FIG. 22 is a composition block diagram of a service processing system according to Embodiment 2 of the present invention.

This embodiment of the present invention further provides a service processing system 100. As shown in FIG. 22, the system includes the foregoing service processing device 80 and the service processing device 90.

Figure 23:
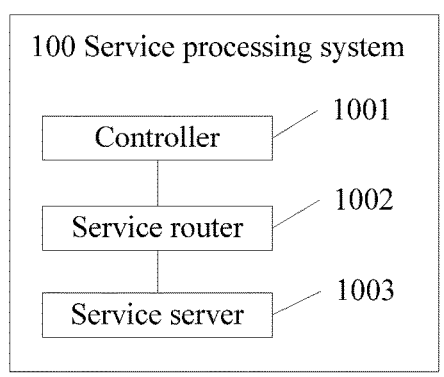
FIG. 23 is a composition block diagram of another service processing system according to Embodiment 2 of the present invention.

When the foregoing service processing device 80 is a controller, and the service processing device go is composed of a service router and a service server, FIG. 23 shows an instance of the service processing system 100.

According to the service processing device and system that are provided by this embodiment of the present invention, a service processing sequence is identified by using a service atom or a service atom cluster, and business service information corresponding to the service atom or the service atom cluster is generated, so that a service router and a service server adjacent to the service router process a to-be-processed service flow according to the business service information. In a service processing manner provided by this embodiment, development of a new service changes into recombination of existing service atoms or adding of a new service atom, so that an operator may proceed to process a service by still using an existing device, and therefore service expansion can be performed without changing an original device of the operator.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service processing method comprising:
    acquiring a label corresponding to a service flow, wherein the label is a service atom cluster, wherein the service atom cluster is a sequence formed by one or more service atoms arranged according to an order, wherein each service atom of the one or more service atoms is used to identify a service processing step required for processing the service flow; and
    sending the label to a service router.

2. The method according to claim 1, wherein the label is a service atom cluster that undergoes encoding processing.

3. The method according to claim 1, wherein the service atom cluster is generated according to information comprising business service information, a service policy, or a user policy.

4. The method according to claim 1, wherein the each service atom represents a service or network processing resource.

5. The method according to claim 1, wherein the sending the label to the service router comprises:
determining, according to a service atom processing capability that has been registered, that the service atom cluster can be processed by the service router; and
after determining that the service atom cluster can be processed by the service router, sending the label to the service router.

6. The method according to claim 5, wherein sending the label to the service router comprises:
determining, according to the registered service atom processing capability, whether the service atom cluster can be processed or not; and
in response to determining that the service atom cluster can be processed, sending the label to an entry service router corresponding to the service flow when the service router processes the service flow in a distributed service routing processing manner.

7. The method according to claim 1, the method further comprises:
generating, according to the registered service atom processing capability, service processing path information corresponding to the service flow;
generating service routing table information corresponding to each service router on the service processing path corresponding to the service processing path information; and
delivering the service routing table information to a corresponding service router.

8. A service processing method comprising:
receiving, by a first service processing device, a label sent by a controller, wherein the label corresponds to a first service flow, wherein the label is service atom cluster, wherein the service atom cluster is a sequence formed by one or more service atoms arranged according to an order, each service atom of the one or more service atoms is used to identify a service processing step required for processing the first service flow;
receiving, by the first service processing device, the first service flow; and
processing, by the first service processing device according to the label and a service routing table.

9. The method according to claim 8, wherein the each service atom represents a service or network processing resource.

10. The method according to claim 8, wherein the processing the first service flow according to the label and the service routing table comprises:
adding the label into a packet of the first service flow; and
sending, by using an output port in the service routing table, the packet carrying the label to a second service processing device.

11. The method according to claim 8, wherein the service routing table is acquired by learning a service atom cluster processing capability of an adjacent service processing device, wherein the service routing table comprises a service atom processing capability and an output port.

12. The method according to claim 8, wherein the service routing table comprises a service flow identifier and a processing sequence number of the first service flow, an output port corresponding to the processing sequence number, and a next-hop label corresponding to the processing sequence number.

13. The method according to claim 12, wherein the processing the first service flow according to the label and the service routing table comprises:
adding, according to a first processing sequence number that is corresponding to the service flow identifier of the first service flow and in the service routing table, a first next-hop label corresponding to the first processing sequence number to a packet of the first service flow; and
sending, by using a first output port corresponding to the first processing sequence number, the packet, to which the first next-hop label is added, of the first service flow to a service server corresponding to the first output port to enable the service server corresponding to the first output port processes the first service flow according to the first next-hop label.

14. The method according to claim 13, the method further comprises:
receiving the first service flow that is sent by the service server corresponding to the first output port and undergoes first processing, and determining whether the first processing sequence number is a last processing sequence number that is corresponding to the service flow identifier and in the service routing table;
if it is determined that the first processing sequence number is the last processing sequence number that is corresponding to the service flow identifier and in the service routing table, removing the first next-hop label in the first service flow that undergoes processing, and forwarding the packet, from which the first next-hop label is removed, of the first service flow out of a service routing network;
if it is determined that the first processing sequence number is not the last processing sequence number that is corresponding to the service flow identifier and in the service routing table, replacing the first next-hop label in the first service flow that undergoes processing with a second next-hop label corresponding to a second processing sequence number that is corresponding to the service flow identifier and in the service routing table; and
sending, by using a second output port corresponding to the second processing sequence number, a packet, carrying the second next-hop label, of the first service flow to a service server corresponding to the second output port to enable the service server corresponding to the second output port process, according to the second next-hop label, the packet, carrying the second next-hop label, of the first service flow.

15. The method according to claim 14, the method further comprises:
receiving the packet, which undergoes processing, of the first service flow, where the packet is sent by the service server corresponding to the second output port and carries the second next-hop label, and determining whether the second processing sequence number is the last processing sequence number that is corresponding to the service flow identifier and in the service routing table; and if it is determined that the second processing sequence number is the last processing sequence number that is corresponding to the service flow identifier and in the service routing table, removing the second next-hop label carried in the packet, which carries the second next-hop label and undergoes processing, of the first service flow, and forwarding the packet, from which the second next-hop label is removed, of the first service flow out of the service routing network.

16. The method according to claim 11, wherein the processing the first service flow according to the label and the service routing table comprises:
searching for, in the service routing table according to the label, and obtaining a third output port; and
carrying the label in the first service flow, and sending the first service flow to a next-hop service processing device by using the third output port to enable the next-hop service processing device process the first service flow according to a service atom processing capability of the next-hop service processing device.

17. A device comprising:
a processor;
a computer-readable storage medium storing a program to be executed by the processor, the program including instructions that, when executed by the processor, cause the processor to:
acquire a label corresponding to a service flow, wherein the label is a service atom cluster, wherein the service atom cluster is a sequence formed by one or more service atoms arranged according to an order, wherein each service atom of the one or more service atoms is used to identify a service processing step required for processing the service flow; and
send the label to a service router.

18. The device according to claim 17, wherein sending the label to the service router comprises:
determining, according to the registered service atom processing capability, whether the service atom cluster can be processed or not; and
in response to determining that the service atom cluster can be processed, sending the label to an entry service router corresponding to the service flow when the service router processes the service flow in a distributed service routing processing manner.

19. The device according to claim 17, the program further comprises instructions that, when executed, cause the processor to:
generate, according to the registered service atom processing capability, service processing path information corresponding to the service flow,
generate service routing table information corresponding to each service router on the service processing path corresponding to the service processing path information, and
deliver the service routing table information to a corresponding service router.

20. A device comprising:
a processor;
a computer-readable storage medium storing a program to be executed by the processor, the program including instructions that, when executed by the processor, cause the processor to:
receive a label sent by a controller, wherein the label corresponds to a first service flow, wherein the label is service atom cluster, wherein the service atom cluster is a sequence formed by one or more service atoms arranged according to an order, each service atom of the one or more service atoms is used to identify a service processing step required for processing the first service flow;
receive the first service flow; and
process the first service flow according to the label and a service routing table.

21. The device according to claim 20, wherein the processing the first service flow according to the label and the service routing table comprises:
adding the label into a packet of the first service flow; and
sending, by using an output port in the service routing table, the packet carrying the label to a second service processing device.

22. The device according to claim 20, wherein the service routing table is acquired by learning a service atom cluster processing capability of an adjacent service processing device, wherein the service routing table comprises a service atom processing capability and an output port.

23. The device according to claim 20, wherein the service routing table comprises a service flow identifier and a processing sequence number of the first service flow, an output port corresponding to the processing sequence number, and a next-hop label corresponding to the processing sequence number.

24. The device according to claim 20, wherein the processing the first service flow according to the label and the service routing table comprises:
adding, according to a first processing sequence number that is corresponding to the service flow identifier of the first service flow and in the service routing table, a first next-hop label corresponding to the first processing sequence number to a packet of the first service flow; and
sending, by using a first output port corresponding to the first processing sequence number, the packet, to which the first next-hop label is added, of the first service flow to a service server corresponding to the first output port to enable the service server corresponding to the first output port processes the first service flow according to the first next-hop label.

25. The device according to claim 24, the program further comprises instructions that, when executed, cause the processor to:
receive the first service flow that is sent by the service server corresponding to the first output port and undergoes first processing, and determine whether the first processing sequence number is a last processing sequence number that is corresponding to the service flow identifier and in the service routing table;
if it is determined that the first processing sequence number is the last processing sequence number that is corresponding to the service flow identifier and in the service routing table, removing the first next-hop label in the first service flow that undergoes processing, and forwarding the packet, from which the first next-hop label is removed, of the first service flow out of a service routing network;
if it is determined that the first processing sequence number is not the last processing sequence number that is corresponding to the service flow identifier and in the service routing table, replacing the first next-hop label in the first service flow that undergoes processing with a second next-hop label corresponding to a second processing sequence number that is corresponding to the service flow identifier and in the service routing table; and
send, by using a second output port corresponding to the second processing sequence number, a packet, carrying the second next-hop label, of the first service flow to a service server corresponding to the second output port to enable the service server corresponding to the second output port process, according to the second next-hop label, the packet, carrying the second next-hop label, of the first service flow.

26. The device according to claim 25, the program further comprises instructions that, when executed, cause the processor to:

receive the packet, which undergoes processing, of the first service flow, where the packet is sent by the service server corresponding to the second output port and carries the second next-hop label, and determine whether the second processing sequence number is the last processing sequence number that is corresponding to the service flow identifier and in the service routing table; and if it is determined that the second processing sequence number is the last processing sequence number that is corresponding to the service flow identifier and in the service routing table, removing the second next-hop label carried in the packet, which carries the second next-hop label and undergoes processing, of the first service flow, and forwarding the packet, from which the second next-hop label is removed, of the first service flow out of the service routing network.

27. The device according to claim 20, wherein the processing the first service flow according to the label and the service routing table comprises:

searching for, in the service routing table according to the label, and obtaining a third output port; and carrying the label in the first service flow, and sending the first service flow to a next-hop service processing device by using the third output port to enable the next-hop service processing device process the first service flow according to a service atom processing capability of the next-hop service processing device.

* * * * *